United States Patent [19]

Cascone

[11] Patent Number: 4,697,819
[45] Date of Patent: Oct. 6, 1987

[54] REMOVABLE DRAWBAR FOR TRAILERS

[76] Inventor: Michael Cascone, 181 Phillips Ave., South Hackensack, N.J. 07607

[21] Appl. No.: 869,308

[22] Filed: Jun. 2, 1986

[51] Int. Cl.⁴ .............................................. B60D 1/14
[52] U.S. Cl. ................................ 280/491 E; 280/493; 280/504
[58] Field of Search .................. 280/480, 482, 491 R, 280/491 E, 493, 495, 504

[56] References Cited

U.S. PATENT DOCUMENTS

| | | | |
|---|---|---|---|
| 2,719,733 | 10/1955 | Riemann | 280/482 |
| 3,897,085 | 7/1975 | Hawkins | 280/491 E |
| 4,257,621 | 3/1981 | Adams et al. | 280/495 |
| 4,261,594 | 4/1981 | Corbett et al. | 280/656 |

Primary Examiner—John J. Love
Assistant Examiner—Donn McGiehan
Attorney, Agent, or Firm—Ralph R. Roberts

[57] ABSTRACT

The drawbar device of this invention illustrates two structures, both substantially similar, and providing a beam member that is removably mounted in a slide guide and retaining bracket. This device may use an I-beam or a tubular steel member. Each beam is provided with divergent arms, with ear portions adapted to be secured, as by pins, to a retainer plate secured to the frame of a dump truck. A front plate on the beam has an adjustably-secured trailer hitch hook by which a trailer may be attached for towing. The retaining bracket is also fixedly secured to the frame of the dump truck.

21 Claims, 13 Drawing Figures

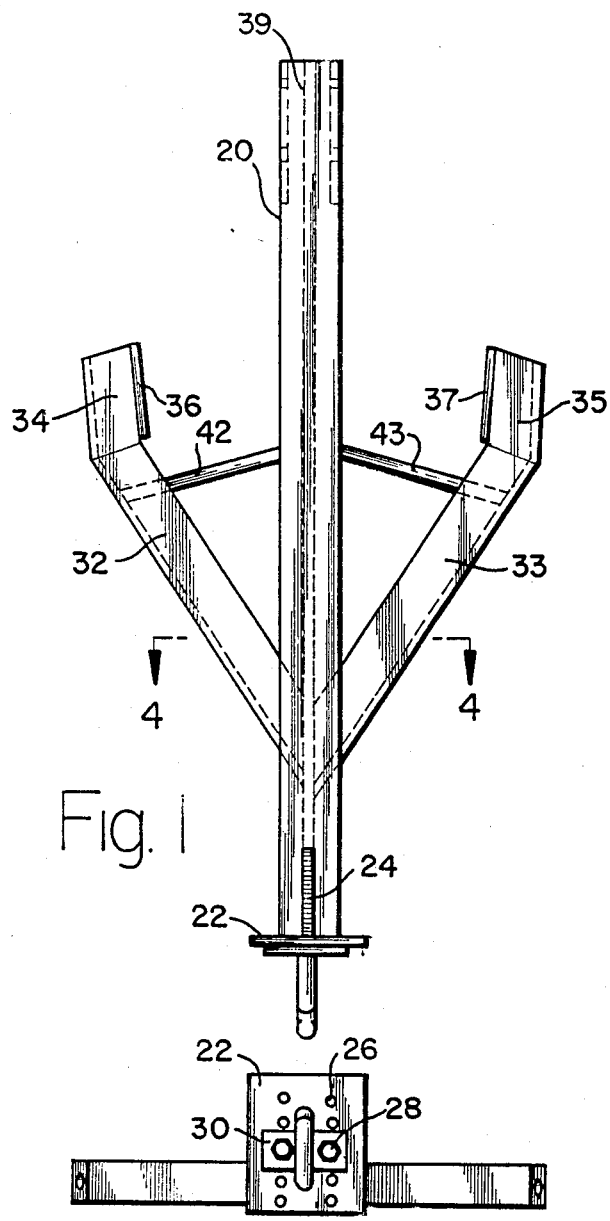
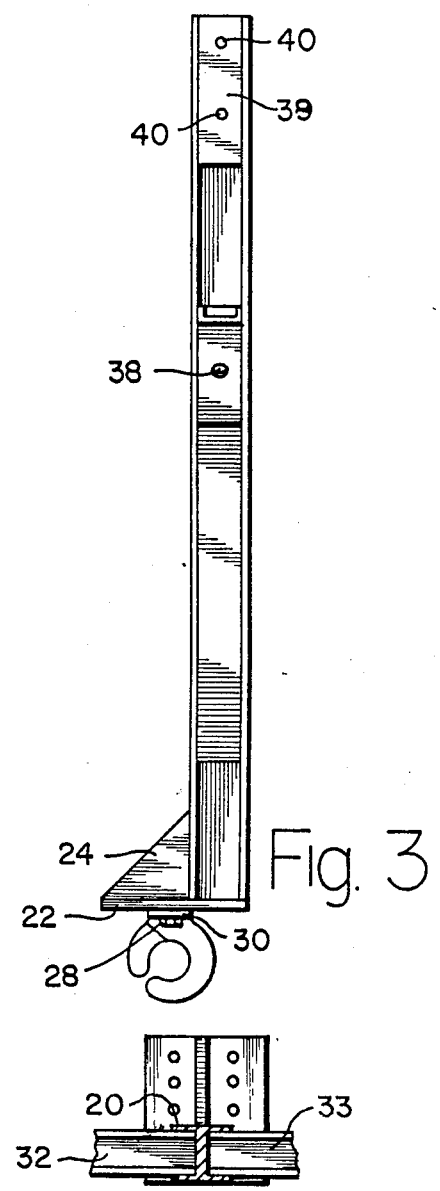
Fig. 1
Fig. 2
Fig. 3
Fig. 4

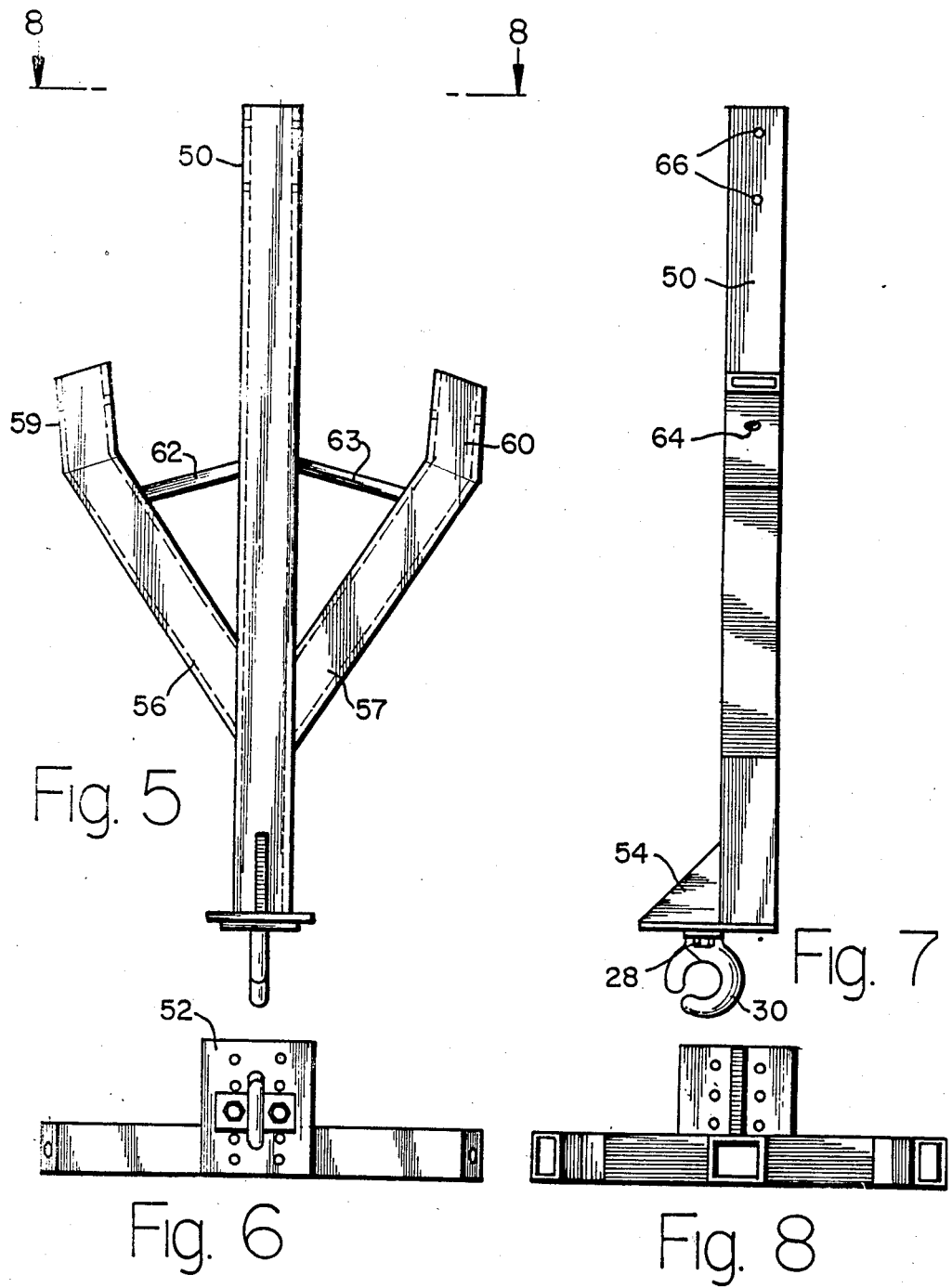

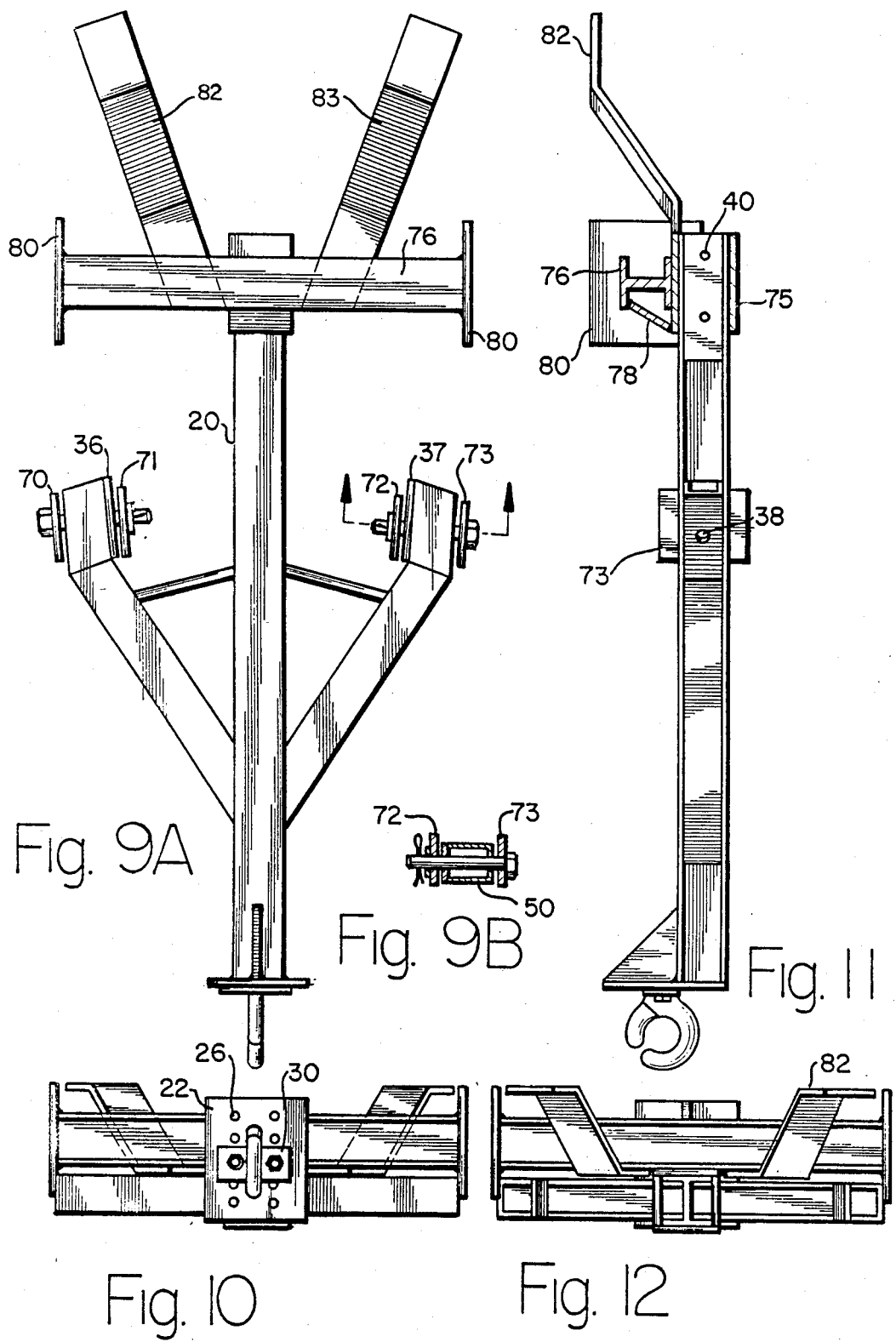

REMOVABLE DRAWBAR FOR TRAILERS

BACKGROUND OF THE INVENTION

1. Field of the Invention

The field or art as established in and by the U.S. Patent Office pertains to "LAND VEHICLES," and, in particular, to dump trucks and to trailer towing bars. The drawbars are removable so that the tailgate may be open for dumping when and as the container body is tilted and the gate is opened.

2. Description of the Prior Art

Dump trucks are very well known and many of such trucks contemplate the lifting of the container body by hydraulic and like means. The end gate is often hinged at the top so that granular material may be dispensed from the opened gate. Often these trucks are used with auxiliary devices which are transported by a trailer member to the site of the job. Regular attaching means, in the form of ball and socket and like means, is a fixedly secured device. The problem in the use of such a device is with the tipping of the body and the swinging of the tailgate. The manufacturers of the trucks and their material hauling bodies have disclaimed and stated that trailer attaching means is not possible because of the swinging arc of motion provided by the body and tailgate. The present invention provides a drawbar that depicts a selected height for the attaching of a trailer. The trailer may require differing heights of attachment since the heights of the trailer front connecting tongue are at a selected distance above a nominal ground.

SUMMARY OF THE INVENTION

This invention may be summarized, at least in part, with reference to its object. It is an object of this invention to provide, and it does provide, a trailer drawbar that is usable for dump trucks in which both the body and end gate are swingable, usually by hydraulic power means, to a gravity dump position. The trailer drawbar is removably mounted to the frame so as to be removed from the truck with the trailer before a dump actuation is made.

In brief, the invention includes a guide and support which is welded to the truck frame. This guide and support is utilized for removably retaining a trailer drawbar device. This removable drawbar device is shown hereinafter in and with two constructions. Each construction utilizes strength steel forms. One embodiment utilizes I-beam components, and the other embodiment utilizes square or rectangular steel tubing. Adjustability of the trailer hitch attachment is provided as the trailer is contemplated to have the floor substantially level. The trailer may be of the two- or four-wheeled variety. The selection and use of the trailer is not a part of this patent concept.

Dump trucks with hinged gate means are usually with tiltable bodies and gates actuated by hydraulic means. This tilting or lifting motion causes the body and/or gate to reach or substantially approach the ground or suport surface. Any projecting fixed drawbar for a trailer hitch is in way of this body or gate and may be damaged or bent. The present invention provides a removable drawbar that is retained in a guideway and secured by pins in a support bracket welded to the frame of the truck. Trailers are conventionally provided or desired when the dump truck is used to transport materials, such as asphalt, to the job, or additionally to bring construction equipment to a job. The dump truck may be used as a received of rocks and the like. Trailers are also used by landscapers.

In addition to the above summary, the following disclosure is detailed to insure adequacy and aid in understanding of the invention. This disclosure, however, is not intended to cover each new inventive concept no matter how it may later be disguised by variations in form or additions of further improvements. For this reason, there have been chosen specific embodiments of a removable drawbar for trailers as adopted for use in a secured retainer in a guideway and showing a preferred means for mounting and removal. These specific embodiments have been chosen for the purposes of illustration and description, as shown in the accompanying drawings wherein:

BRIEF DESCRIPTION OF THE DRAWINGS

FIGS. 1, 2 and 3 represent plan, front and side views of a removable drawbar constructed of steel I-beam end plate-type materials;

FIG. 4 represents a fragmentary sectional view of the removable drawbar, this view taken on the line 3—3 of FIG. 1 and looking in the direction of the arrows;

FIGS. 5, 6 and 7 represent plan, front and side views of a removable drawbar very similar to that of FIGS. 1, 2 and 3, but with this member constructed of square steel tubing;

FIG. 8 represents a fragmentary sectional view of the removable drawbar, this view taken on the line 8—8 of FIG. 5 and looking in the direction of the arrows;

FIG. 9A represents a plan view of a removable drawbar as in FIG. 1, and diagrammatically showing a guide and retaining means for mounting said removable drawbar;

FIG. 9B represents a very fragmentary sectional view, quite diagrammatic, this view taken on the line 9B—9B of FIG. 9A and looking in the direction of the arrows;

FIG. 10 represents a front view of the assembly of FIG. 9A;

FIG. 11 represents a side view of the assembly of FIG. 9A and diagrammatically showing the relationship of the members to more clearly show the construction, and a fragmentary portion of this view taken on the line 11—11 of FIG. 9A thereof and looking in the direction of the arrows, and FIG. 12 represents a rear view of the assembly of FIG. 9A.

In the following description and in the claims, various details are identified by specific names for convenience. These names are intended to be generic in their application. Corresponding reference characters refer to like members throughout the several figures of the drawings.

The drawings accompanying, and forming part of, this specification disclose details of construction for the purpose of explanation, but structural details may be modified without departure from the concept and principles of the invention and the invention may be incorporated in other structural forms than shown.

EMBODIMENT OF FIGS. 1, 2 3 AND 4

Referring next to the drawings, and in particular to the showing of FIGS. 1, 2, 3 and 4, there is depicted a beam member 20 which, in this embodiment, is an I-beam. The front end of this beam has a plate 22 secured thereto as by welding and the like. This plate 22 is additionally supported at its upper extent by a gusset 24. Plate 22 has a plurality of holes 26 spaced and sized to receive bolts or cap screws 28. A hitch connector 30 is shown as secured to plate 22 at one of the pairs of holes. This plate is shown with a series of holes that allow the connector 30 to be secured and positioned at a selected height. This height is varied in accordance with the desired, substantially level height of the trailer platform. This height is often determined by the size of the wheels and/or tires.

Extending outward from the beam member 20 are diverging arms 32 and 33, which are contemplated to be of channel iron, and have the forward ends shaped to fit within the I-beam configuration (FIG. 4). Attachment is usually by welding. The other ends of arms 32 and 33 are cut to provide a mating surface for attaching short ear portions 34 and 35. This attachment is also conventionallas by welding. Reinforcing plates 36 and 37 are provided and attached, as shown, to provide a closing of the legs of the channel and provide spaced sides. Holes 38 are provided for removable mounting of this drawbar. As the web of the I-beam is or may be thin, there are provided at the rear of the beam member 20, reinforcing plates 39 and, after securing, there are formed in the combined thickness two through holes 40.

Stiffening rods 42 and 43 are arrayed as seen in FIG. 1 so as to prevent deflection or distortion (momentary or permanent) when and as the dump truck is moved forwardly with a trailer, not shown, in tow. Sudden jerks may and do cause excess or peak forces on the secured drawbar device, and these stiffener rods assist in distributing the load on the drawbar assembly and the extending arms 32 and 33. The use of holes 38 is noted hereinafter. Although the arms 32 and 33 and ears 34 and 35 are shown as channel iron, with the web to the outside, this is merely a matter of selection. In FIG. 4, the configuration of the assembly and securing of the diverging arms 32 and 33 with the I-beam 20 is depicted. The internal shaping of arms 32 and 33 for a fitting and securing by welding is contemplated. The use of and positioning of the arm members is merely a matter of selection and strength.

EMBODIMENT OF FIGS. 5, 6, 7 and 8

In FIGS. 5, 6, 7 and 8, there is depicted a removable drawbar assembly, which is very similar to that shown and described in connection with FIGS. 1, 2, 3 and 4 above. Rather than an apparatus of structural steel, I-beam and channel iron, this embodiment utilizes square or rectangulr steel tubing. As depicted, a beam member 50 is of steel tubing (square shown) having a forward end closed by a plate 52. This plate is like plate 22 in FIG. 2. Gusset 54 is also provided to prevent bending with and when a towing stress is present. The plurality of holes 26 is sized and spaced in pairs for removably securing connector 30 by cap screws or bolts 28. Adjustment for height of this connector 30 is contemplated.

As the beam 50 is of steel tubing, it requires only cutting to length and the attachment of plate 52 and gusset 54.

As the side extents of beam 50 present a flat attaching surface, outwardly-diverged arms 56 and 57, which are cut at a bevel, present seating surfaces adjacent these flat side extents of beam 50. These arms are secured to said beam as by welding. The other ends of these arms are also cut at a small angle to provide a mating surface for the securing thereto of short ear extensions, respectively identified as 59 and 60. Stiffener rods 62 and 63 are secured as by welding to the inner surfaces of arms 56 and 57 and the sides of beam 50. In each ear portion 59 and 60 there are formed through holes 64, for a purpose to be disclosed hereinafter. Also, in the side extents of beam 50 and at the rear thereof are two transverse and like securing holes 66. FIG. 8 depicts the arrangement of the several components as fragmentarily seen in the view taken on the line 8—8 of FIG. 5.

EMBODIMENT OF FIGS. 9A, 9B, 10, 11 AND 12

Referring still to the drawings and the assembly shown in FIGS. 9A, 9B, 10, 11 and 12, there is depicted the use of the drawbar assembly of FIGS. 1 through 4, but the embodiment of the drawbar of FIGS. 5-8 may be used. This showing utilizes the frame or chassis of the dump truck to carry a securing means to insure that all towing forces are transferred from the drawbar to the truck frame or chassis. In the view of FIG. 9A, the I-beam drawbar of FIG. 1 is shown, with the arms 32 and 33 having ears 34 and 35 attached thereto and with plates 36 and 37 also utilized. Lug retainer plates 70, 71, 72 and 73 are sized, positioned and disposed so as to straddle the ear ends and plates of the drawbar assembly. Conventionally, these lug retainer plates are attached to the truck frame as by welding. Bolts and nuts and other means, of course, may be employed.

A slide guide for the entering end of beam 20 is provided in and by a bracket assembly which includes a determined length of tubular pipe 75 or the like, which is sized to provide a through retainer for the end of beam 20 or beam 50. A transverse strut or member 76 is shown as an I-beam, and at the forward end of pipe 75 a stiffener 78 is provided to insure rigidity and retention. This side view of FIG. 11 is shown in section at the line 11—11 to illustrate the construction and preferred use. At each end of strut 76 is attached a plate 80, which is contemplated to be secured to the truck frame, not shown. Extending rearwardly from the strut 76 are two attaching stiffeners 82 and 83.

In FIG. 9B, instead of the beam member of FIG. 1, the square tubular beam member 50 is depicted between retainers 72 and 73. Holes 38 are formed in the retainers 70, 71, 72 and 73, and are in alignment with similar holes formed and provided in the ear extensions. The holes 40 formed in the I-beam and reinforcement 39 (FIG. 3) and in the rear or entering end of beam 50 (FIG. 7) are sized and aligned to receive and retain a securing pin or bolt passed through similar apertures in the retainer 75.

USE AND OPERATION OF THE EMBODIMENT OF FIGS. 1 THROUGH 12

It is contemplated that the drawbar member may be of I-beam or of square tubular construction, but other shapes may be utilized as long as said beam member is of sufficient strength to withstand the force required for towing the trailer. As and since the canting of the dump-truck body and gate is by and with power, it is desirable that the fore portion of this drawbar be absent when the load body is tilted. The beam is withdrawn before tilting and unloading the truck. Retention of the drawbar in position during use contemplates the use of pins or bolts. If pins are used, a pin, cotter pin and washers are provided for holes 38 and 40, for a total of four pins. For mounting and securing the tow bar, the entering end of the beam is inserted into the passageway in member 75. Pins are pushed through holes 38 and other pins are pushed through holes 40 and, with cotter pins, prevent accidental loss. Bolts or cap screws 28 are adjusted and tightened so that connector 30 is positioned at the desired height to suit the towing of the trailer.

For removal, the trailer is usually unhitched and then the bolts or pins in holes 38 (64) and 40 are removed so that the drawbar may be drawn outwardly. Reinstallation is by the reverse procedure. It is to be noted that the member 20 is identified as an I-beam, and member 50 is identified as square tubing. These suggested structural members are merely a matter of design and weight. Solid components are excessively heavy and reduce gas mileage. U-channel construction, independently and in combination, is also contemplated. Welding is noted as a means for securing, but bolts, rivets, brazing and epoxy cements are also known. Securement is merely a matter of design and selection. Rods 62 and 63 are shown as preferred stiffeners, but instead, rods, gussets or like stiffening means may be provided to absorb deflection and/or bending of arms 56 and 57.

I-beam and channel iron are suggested in the device of FIGS. 1 through 4, but other combinations may be used, and the arms and ears 32, 33, 34 and 35 may be of rectangular tubing. Rather than inwardly-extending channel iron, the channel iron may be outwardly-directed. Instead of pins, bolts and nuts may be used for removable securement. It is also contemplated that hooks and other latching means may be used alternatively. What is provided by this apparatus is a device that is removed before the dump truck is tilted, and its end gate is likewise protected from unwanted and accidental damage.

Terms such as "left," "right," "up," "down," "bottom," "top," "front," "back," "in," "out" and the like are applicable to the embodiments shown and described in conjunction with the drawings. These terms are merely for the purposes of description and do not necessarily apply to the position in which the drawbar device may be constructed or used.

While a particular embodiment of the drawbar and the beam therefor is depicted and an alternate embodiment has been shown and described, it is to be understood that the invention is not limited thereto and protection is sought to the broadest extent the prior art allows.

What is claimed is:

1. A drawbar device which is removably secured to a dump truck, with said drawbar device having the secured drawbar adapted to transfer a pulling force from an attached and towed and towable trailer to the frame of said dump truck, this drawbar device adapted for easy and quick removal before, during and after replacement positioning of the dump truck load body whose discharge end moves into the drawbar device when the load body is elevated and repositioned by associated lift means, said drawbar device including:
    (a) a slide guide and retaining bracket conformed and disposed to be fixedly secured to the frame of the dump truck, this bracket positioned inward of the discharge end of the truck load body and, when secured, providing in said bracket a guideway of determined size and extent, this bracket having securing means at and with said guideway;
    (b) spaced-apart, fixed support lug retainers fixedly secured to the frame of the dump truck, these lug retainers disposed intermediate the discharge end of the truck load body and the slide guide, and with the lug retainers arrayed so as to be substantially equal distance from a midpoint of the frame of the dump truck;
    (c) a beam member portion of said device, with said beam member to be used in association with a dump truck to provide a strength member of metal and, when inserted into the guideway of the bracket and removably retained therein, providing force resisting means to the towing force of an attached trailer;
    (d) a pair of substantially like divergent arms fixedly secured at one end to the beam member, and with the other end of each arm having means for removably securing said other and a distal end to a lug secured to the frame of the dump truck, each said other end, with the drawbar device in mounted condition, disposed to be brought to an adjacent relationship with support lug, and
    (e) a front plate at the front end of said beam, providing means for selectively positioning and retaining a trailer hitch connector mounted thereon in a secured condition.

2. A drawbar device as in claim 1 in which the beam member is an I-beam of steel.

3. A drawbar device as in claim 2 in which the divergent arms are formed from channel iron, with attached short ear portions providing means for securing the web portion thereof so that said web portions are substantially parallel to the beam, and in each ear providing a through hole for removably mounting the device.

4. A drawbar device as in claim 3 in which the channel iron is disposed with the flanges thereof outwardly, and with the web of the ear portions reinforced by added plate members, and the through holes extend through said webs and plates and are in coincidence with both the web and added plate members.

5. A drawbar device as in claim 3 in which the divergent arms are additionally retained and supported against deflection by attached rods, said deflection caused by towing forces, the rods secured at their ends to an arm and the beam.

6. A drawbar device as in claim 3 in which the beam is reinforced at its entering end with attached plate-like members, said plate members secured to the web of the beam, and through these reinforcement members and web there are formed through holes.

7. A drawbar device as in claim 2 in which the front plate is attached to the beam as by welding, and this front plate has a plurality of pairs of holes adapted for positioning and mounting the connection retainer.

8. A drawbar device as in claim 1 in which the beam member is tubular and of steel.

9. A drawbar device as in claim 8 in which the divergent arms are formed from tubular steel with attached short ear portions providing therewith substantially parallel surfaces to the sides of said beam, and in each ear portion there are provided through holes for removably mounting the device.

10. A drawbar device as in claim 9 in which the divergent arms are additionally retained and supported against deflection by attached rods, said deflection caused by towing forces, the rods secured at their ends to an arm and the beam.

11. A drawbar device as in claim 9 in which the entering end of the beam is formed with at least one drilled hole in each of its side extents.

12. A drawbar device as in claim 11 in which the front plate is attached to the beam as by welding, and this front plate has a plurality of pairs of holes adapted for positioning and mounting the connection retainer.

13. A drawbar device as in claim 11 in which the entering end of the beam is formed with two holes in each side extent, with the holes in alignment.

14. A drawbar device as in claim 8 in which the tubular beam is square tubing.

15. A drawbar device as in claim 1 in which the slide guide and retaining bracket includes lug retaining plates secured to the frame of the dump truck, said lug plates each having a hole adapted to receive and retain a pin or like device which is also passed through a hole in the attached ear, and with said retaining bracket having support plates secured to each end of a transverse strut which carries the guideway member.

16. A drawbar device as in claim 15 which further includes fixedly attaching the support plates to the frame of the truck so that the guideway member is substantially midway of the truck frame, and said guideway is a selected length of rectangular tubular steel which is positioned to maintain a retained beam substantially parallel to the ground and midway of the frame members.

17. A drawbar device as in claim 16 in which the transverse strut is an I-beam and the rectangular steel portion is fixedly secured to said strut.

18. A drawbar device as in claim 17 in which the transverse bar is additionally supported by stiffeners, each having one end attached to the transverse strut and the other end to the frame of the truck.

19. A drawbar device as in claim 18 which further includes forming in the rectangular steel guidway portion at least one through hole adapted to mate with like holes sized and positioned in the beam.

20. A drawbar device as in claim 19 in which the retention of the entering end of the beam is by a plurality of through removable pins and the like, and retention of the ear to a lug plate is also a removable pin and the like.

21. A drawbar device as in claim 1 in which each divergent arm has its distal end provided with a surface portion in which a through aperture is formed and, when the drawbar device is in mounted condition, the through aperture and a like aperture formed in each lug retainer are substantially in alignment so that a removable pin or the like may be passed therethrough for retention of the drawbar device in said mounted condition.

* * * * *